(12) United States Patent
Wei et al.

(10) Patent No.: US 9,297,147 B1
(45) Date of Patent: Mar. 29, 2016

(54) SEMI-AUTONOMOUS TRACTOR SYSTEM CREST RAMP REMOVAL

(71) Applicant: Caterpillar Inc., Peoria, IL (US)

(72) Inventors: Mo Wei, Dunlap, IL (US); Thandava K. Edara, Peoria, IL (US); Michael Taylor, Swissvale, PA (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/501,782

(22) Filed: Sep. 30, 2014

(51) Int. Cl.
*G06F 7/70* (2006.01)
*E02F 9/20* (2006.01)
*G05D 1/00* (2006.01)
*E02F 3/84* (2006.01)

(52) U.S. Cl.
CPC .............. *E02F 9/2029* (2013.01); *E02F 3/841* (2013.01); *E02F 3/844* (2013.01); *G05D 1/0088* (2013.01)

(58) Field of Classification Search
CPC ........ E02F 9/261; G05D 1/0219; G06F 17/00
USPC .............. 701/50, 27, 32.3; 702/33, 44; 172/2
See application file for complete search history.

(56) References Cited

U.S. PATENT DOCUMENTS

| | | | |
|---|---|---|---|
| 5,950,141 A | 9/1999 | Yamamoto et al. | |
| 8,456,327 B2 * | 6/2013 | Bechtel et al. | 340/937 |
| 8,700,272 B2 | 4/2014 | Stratton et al. | |
| 8,706,363 B2 | 4/2014 | Stratton et al. | |
| 8,730,233 B2 | 5/2014 | McDaniel et al. | |
| 2012/0139325 A1 | 6/2012 | Norberg et al. | |
| 2014/0032058 A1 * | 1/2014 | Stratton et al. | 701/50 |
| 2014/0032132 A1 * | 1/2014 | Stratton et al. | 702/33 |

* cited by examiner

*Primary Examiner* — Luke Huynh
(74) *Attorney, Agent, or Firm* — Miller, Matthias & Hull LLP

(57) ABSTRACT

A computer-implemented method for removing a crest end ramp along a work surface using a machine is provided. The computer-implemented method may include defining a volume threshold corresponding to a crest end region of the work surface where the volume threshold may be adjustable based on one or more parameters associated with the machine and the work surface, calculating a volume of material within the crest end region, comparing the calculated volume with the volume threshold, issuing a ramp cut if the calculated volume approximates but does not exceed the volume threshold, and issuing a short cut if the calculated volume exceeds the volume threshold.

20 Claims, 5 Drawing Sheets

SEMI-AUTONOMOUS TRACTOR SYSTEM CREST RAMP REMOVAL

TECHNICAL FIELD

The present disclosure relates generally to operating semi-autonomous machines at a work site, and more particularly, to systems and methods for automatically identifying and removing crest end ramps.

BACKGROUND

Machines such as, for example, track-type tractors, dozers, motor graders, wheel loaders, and the like, are used to perform a variety of tasks. For example, these machines may be used to move material and/or alter work surfaces at a worksite. The machines may be manned machines, but may also be autonomous or semi-autonomous vehicles that perform these tasks in response to commands remotely or locally generated as part of a work plan for the machines. Moreover, the machines may receive instructions in accordance with the work plan to at least partially autonomously perform repetitive and relatively localized operations such as cutting, digging, loosening, loading, carrying, and any other manipulation of materials at the worksite.

Among other things, autonomous or semi-autonomous machines, such as tractors or dozers, are frequently used to perform normal cuts along slots of a work surface in accordance with predetermined pass or cut profiles. Over the course of several repeated normal cuts, however, ramps may begin to form at the crest or crest end of a given slot immediately prior to the valley thereof. If left unaddressed, these crest end ramps can pose significant challenges for the work machines. Specifically, based on the position, shape or size of the ramp, it may be difficult for the machines to sufficiently remove the ramp during a normal cut even if the volume of material in the ramp is well within the removal capacity of the machine and well within the limits of the planned cut profile. Based on the size and slope of the ramp, machines may also have difficulties traveling over the ramp which may result in unwanted delays or other setbacks.

In typical autonomous or semi-autonomous settings, such crest end ramps may remain undetected until it is too large to be ignored, at which point, the ramps may need to be removed or otherwise addressed manually. Although several technological advancements have been made in the general field of automated worksite operations, currently existing autonomous or semi-autonomous machines nonetheless lack more ability to more efficiently address crest end ramp formations. In U.S. Publication No. 2012/0139325 ("Norberg, et al."), for example, systems and schemes are disclosed for automatically identifying the edges of terrain and classifying the edges as either a toe or a crest. However, Norberg, et al. still lack the ability to automatically monitor for oversized ramps at a crest, or the ability to automatically engage removal of any detected ramps.

In view of the foregoing inefficiencies and disadvantages associated with conventional autonomous or semi-autonomous machines and control systems therefor, a need exists for more intuitive control systems which provide earlier detection of crest end ramps and more efficient means for automatically removing such ramps.

SUMMARY OF THE DISCLOSURE

In one aspect of the present disclosure, a computer-implemented method for removing a crest end ramp along a work surface using a machine is provided. The computer-implemented method may include defining a volume threshold corresponding to a crest end region of the work surface where the volume threshold being adjustable based on one or more parameters associated with the machine and the work surface, calculating a volume of material within the crest end region, comparing the calculated volume with the volume threshold, issuing a ramp cut if the calculated volume approximates but does not exceed the volume threshold, and issuing a short cut if the calculated volume exceeds the volume threshold.

In another aspect of the present disclosure, a control system for removing a crest end ramp along a work surface using a machine is provided. The control system may include a memory configured to retrievably store one or more algorithms, and a controller in communication with the memory. Based on the one or more algorithms, the controller may be configured to at least calculate a volume of material within a crest end region of the work surface, compare the calculated volume with an adjustable volume threshold corresponding to the crest end region, and issue a ramp cut if the calculated volume approximates but does not exceed the volume threshold.

In yet another aspect of the present disclosure, a controller for removing a crest end ramp along a work surface using a machine is provided. The controller may include a threshold module configured to define a volume threshold corresponding to a crest end region of the work surface and adjust the volume threshold based on one or more parameters associated with the machine and the work surface, a calculation module configured to calculate a volume of material within the crest end region, a comparison module configured to compare the calculated volume with the volume threshold, and a special cut module configured to issue a ramp cut if the calculated volume approximates but does not exceed the volume threshold, and issue a short cut if the calculated volume exceeds the volume threshold.

DETAILED DESCRIPTION

Although the following sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term is expressly defined herein, there is no intent to limit the meaning of that term, either expressly or by implication, beyond its plain or ordinary meaning, and such term should not be interpreted to be limited in scope based on any statement made in any section of this patent other than the language of the claims. To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

Figure 1:
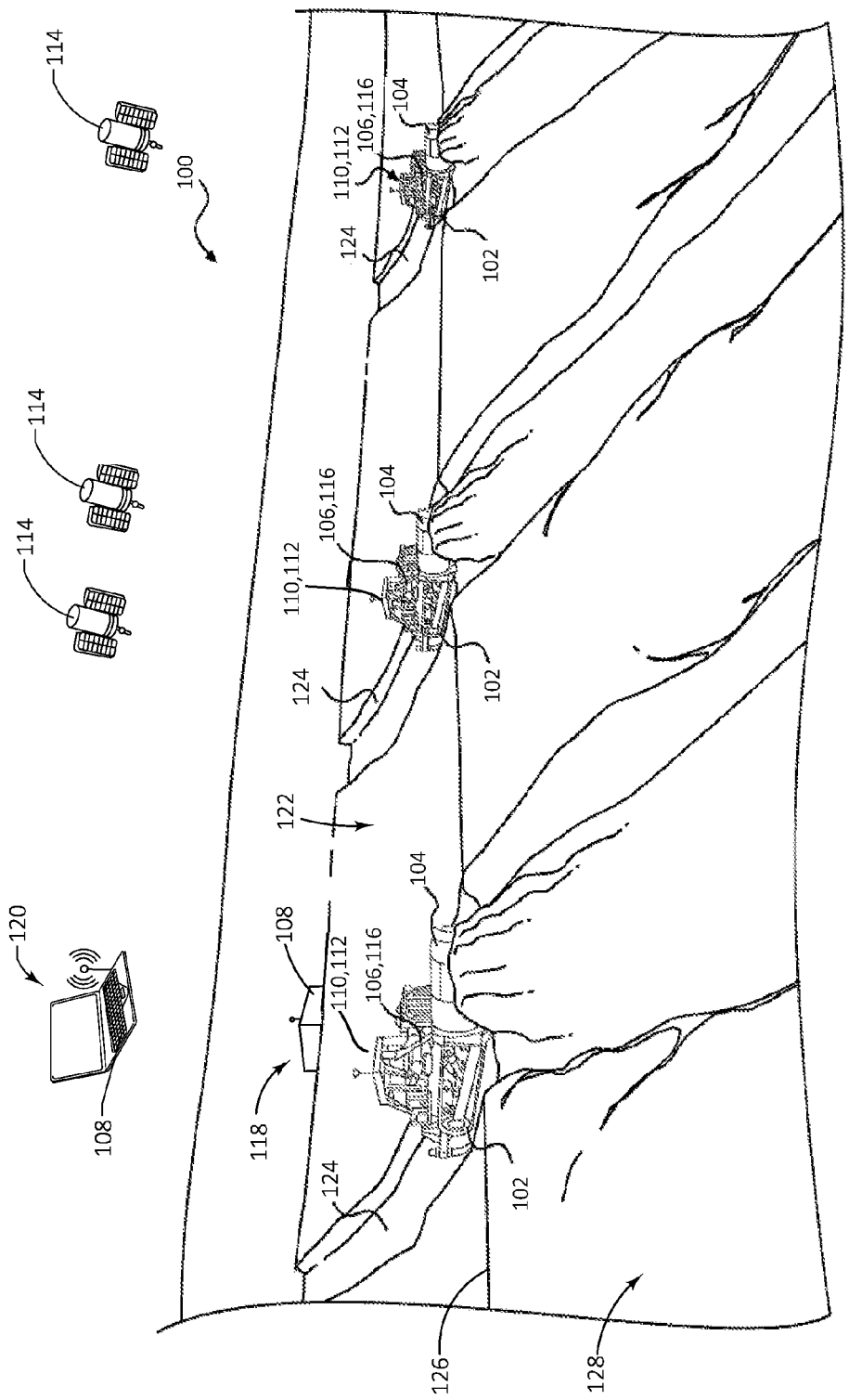
FIG. 1 is a pictorial illustration of one exemplary worksite.

Referring now to FIG. 1, one exemplary worksite 100 is illustrated with one or more machines 102 performing predetermined tasks. The worksite 100 may include, for example, a mine site, a landfill, a quarry, a construction site, or any other type of worksite. The predetermined task may be associated with altering the geography at the worksite 100, such as a dozing operation, a grading operation, a leveling operation, a bulk material removal operation, or any other type of operation that results in geographical modifications within the worksite 100. The machines 102 may be mobile machines configured to perform operations associated with industries related to mining, construction, farming, or any other industry known in the art. The machines 102 depicted in FIG. 1, for example, may embody earth moving machines, such as tractors or dozers having implements 104, such as blades, rippers, or the like, which may be movable by way of one or more actuators 106. The machines 102 may also include other types of autonomous or at least semi-autonomous machines not shown or disclosed herein.

The operations of the machines 102 within the worksite 100 may be managed by a control system 108 that is at least partially in communication with the machines 102. Moreover, each of the machines 102 may include any one or more of a variety of feedback devices 110 capable of signaling, tracking, monitoring, or otherwise communicating relevant machine parameters or other information to the control system 108. For example, each machine 102 may include a locating device 112 configured to communicate with one or more satellites 114, which in turn, may communicate to the control system 108 various parameters and information pertaining to the position and/or orientation of the machines 102 relative to the worksite 100. Each machine 102 may additionally include one or more implement sensors 116 configured to track and communicate position and/or orientation information of the implements 104 to the control system 108. Furthermore, any one or more of the feedback devices 110, locating devices 112, satellites 114, implement sensors 116, and the like, may be used by the control system 108 to derive information relevant to the worksite 100, such as in terms of volume of material remaining, volume of material removed, geographical features of the worksite 100, and any other information that may aid in the excavation process.

The control system 108 may be implemented in any number of different arrangements. For example, the control system 108 may be at least partially implemented at a command center 118 situated locally and/or remotely relative to the worksite 100 with sufficient means for communicating with the machines 102, for example, via satellites 114, or the like. Additionally or alternatively, the control system 108 may be implemented using one or more computing devices 120 with means for communicating with one or more of the machines 102 or one or more command centers 118 that may be locally and/or remotely situated relative to the worksite 100. In still further alternatives, the control system 108 may be at least partially implemented on-board any one or more of the machines 102 that are also provided within the worksite 100. Other suitable modes of implementing the control system 108 are possible and will be understood by those of ordinary skill in the art.

Using any of the foregoing arrangements, the control system 108 may generally be configured to monitor the positions of the machines 102 and/or machine implements 104 relative to the worksite 100 and a predetermined target operation, and provide instructions for controlling the machines 102 and/or machine implements 104 in an efficient manner in executing the target operation. In certain embodiments, the machines 102 may be configured to excavate areas of a worksite 100 according to one or more predefined excavation plans. The excavation plans may include, among other things, information relating to the location, size, and shape of each of a plurality of cuts to be made within a given work surface 122 of the worksite 100, for instance, along a plurality of slots 124, or the like, provided across the work surface 122. The excavation plans may additionally include information pertaining to the location of the crest 126 and/or valley 128 of the work surface 122. The control system 108 may closely monitor progress of the excavation, for instance, by tracking gradual changes in the work surface 122 relative to the planned target operation or profile, so as to quickly identify and appropriately address any unwanted deviations.

Figure 2:
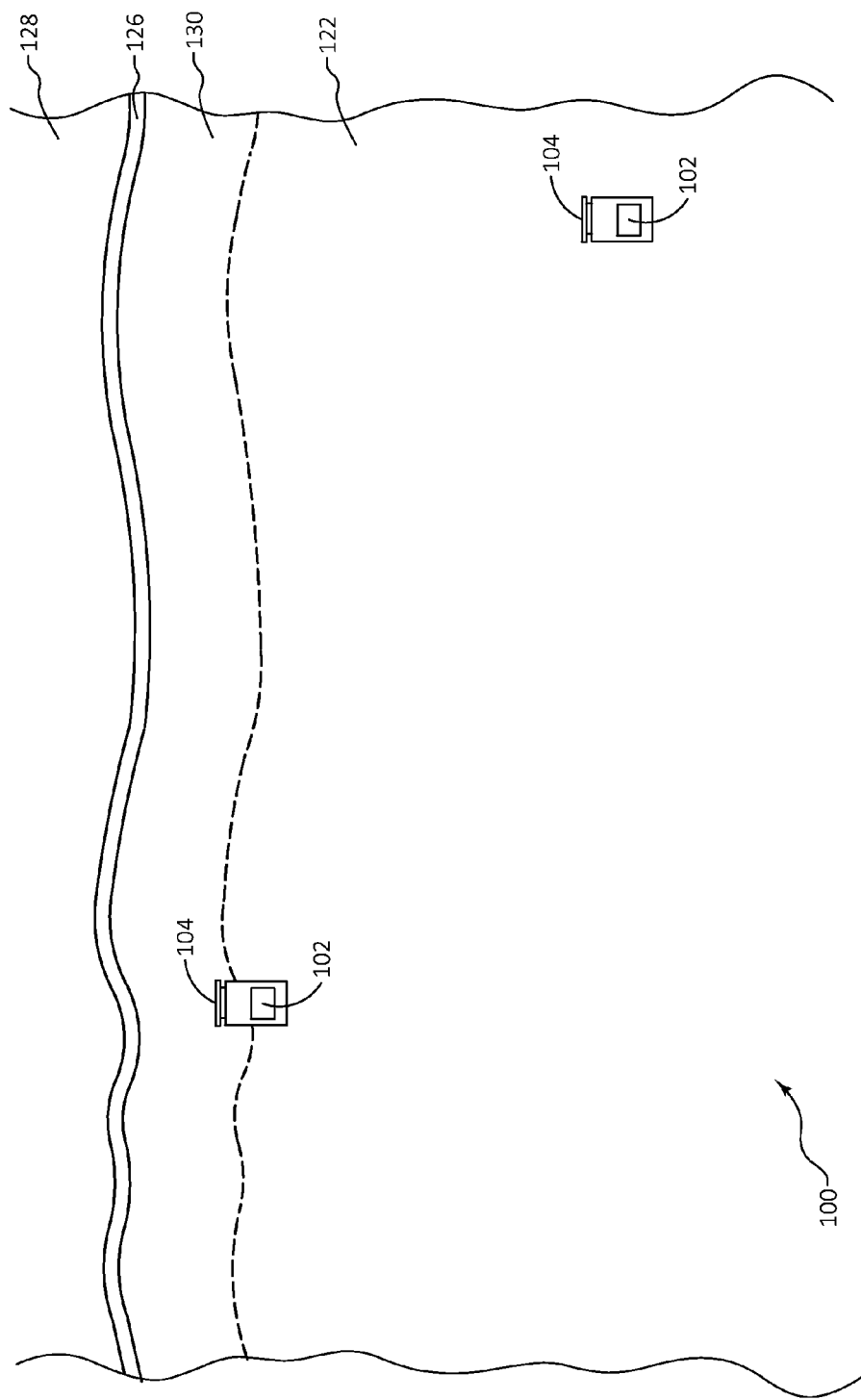
FIG. 2 is a pictorial illustration of a top view of one exemplary work surface having a crest end region, crest and dumping valley.

As shown in FIG. 2, for example, the worksite 100 may generally include the work surface 122, a crest end region 130, a crest 126 and a valley 128. Specifically, machine 102, such as tractors or dozers, may employ implements 104, such as blades, or the like, to make cuts in the work surface 122 and carry the loaded material past the crest end region 130 and the crest 126 to unload the material into the valley 128. Furthermore, the boundaries or other parameters pertaining to each of the crest end region 130, crest 126 and valley 128 may be at least partially mapped or otherwise predefined by within one or more given target profiles for the worksite 100. Still further, gradual changes in one or more of the work surface 122, such as the crest end region 130, crest 126 and valley 128 associated therewith, may be monitored by the control system 108 while the machines 102 operate to ensure that the excavation is carried out in accordance with the planned target profile. Among other things, the control system 108 may additionally monitor for any signs of crest end ramp formations, or unwanted inclines within the crest end region 130 that are significantly raised relative to the work surface 122 or slot 124.

Figure 3:
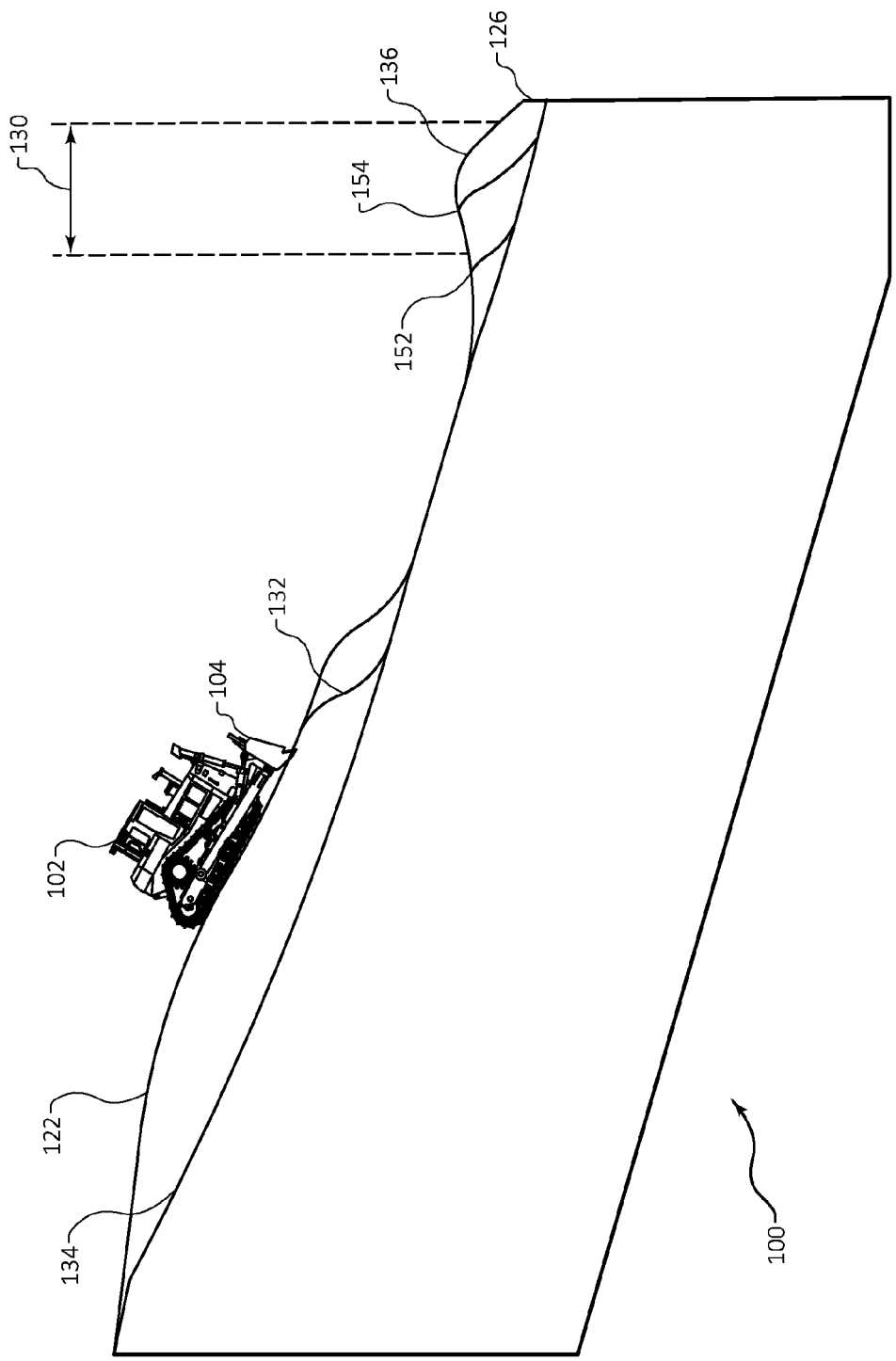
FIG. 3 is a pictorial illustration of a crest end ramp disposed within the crest end region of one exemplary work surface.

Turning to FIG. 3, one embodiment of a machine 102, such as a tractor or dozer having a blade implement 104, is shown as positioned on a work surface 122 of a worksite 100. In particular, the machine 102 may be configured to perform a plurality of normal cuts 132 along the work surface 122 to ultimately achieve a surface corresponding to a given target profile 134 as shown. During the excavation and over the course of repeated normal cuts 132, however, a crest end ramp 136 may form near the crest 126 or within the crest end region 130 due to any number of different factors, for example, excess buildup of material at the crest 126, hard sections within the crest end region 130 which prevent deeper cuts, or the like. A crest end ramp 136 that is undetected or left unaddressed may over time become sizeable enough to disrupt the excavation and cause unwanted delays or other setbacks. More specifically, based on the size and slope of the crest end ramp 136, the machines 102 may have difficulties traveling over the crest end ramp 136 and reaching the edge of the crest 126 to unload material thereover. Also, even if the volume of material in the crest end ramp 136 is well within the theoretical removal capacity of a given cut profile, a machine 102 initiating a normal cut 132 at the position shown in FIG. 3 for instance may still be unable to adequately remove or travel over the crest end ramp 136 due to physical limitations of the machine 102 or other factors.

Figure 4:
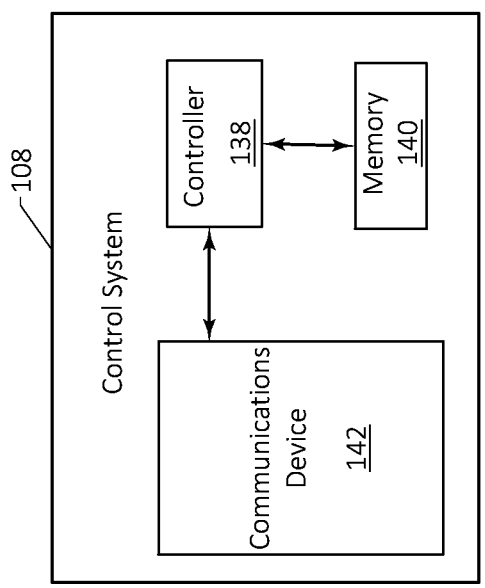
FIG. 4 is a diagrammatic illustration of an exemplary control system that may be used at a worksite to automatically identify and remove crest end ramps.

Accordingly, with reference to FIG. 4, one exemplary embodiment of a control system 108 is schematically shown that may be used in conjunction with one or more machines 102 within a worksite 100 to provide early detection of crest end ramps 136 as well as automatic removal thereof. As shown, the control system 108 may generally include, among other things, a controller 138, a memory 140, and a communications device 142. More specifically, the controller 138 may be configured to operate according to one or more algorithms that are retrievably stored within the memory 140. The memory 140 may be provided on-board the controller 138, external to the controller 138, or otherwise in communication therewith. The communications device 142 may be configured to enable the controller 138 to communicate with one or more of the machines 102, and provide parameters or information pertaining to the position and/or orientation of the machines 102 and the machine implements 104, for example, via satellites 114, or any other suitable means of communication. Moreover, the controller 138 may be implemented using any one or more of a processor, a microprocessor, a microcontroller, or any other suitable means for executing instructions stored within the memory 140. Additionally, the memory 140 may include non-transitory computer-readable medium or memory, such as a disc drive, flash drive, optical memory, read-only memory (ROM), or the like.

Figure 5:
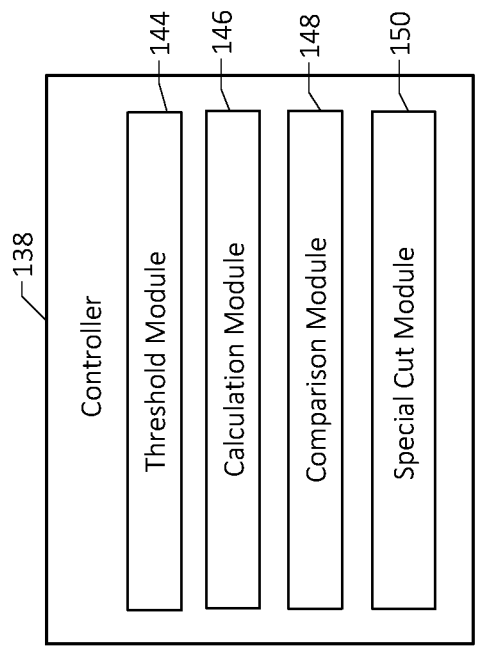
FIG. 5 is a diagrammatic illustration of an exemplary controller that may be used at a worksite to automatically identify and remove crest end ramps.

Referring now to FIG. 5, the controller 138 of the control system 108 may be preprogrammed to monitor for formations of crest end ramps 136, as well as automatically engage special cuts for removing detected crest end ramps 136 according to one or more algorithms, which may generally be categorized into, for example, a threshold module 144, a calculation module 146, a comparison module 148, and a special cut module 150. In general, the threshold module 144 may be configured to define an adjustable volume threshold which corresponds to the crest end region 130 of a given work surface 122, and adjust the volume threshold based on one or more parameters associated with the machine 102 and/or the work surface 122. More specifically, the volume threshold may correspond to the minimum volume by which excess material within the crest end region 130 can be classified as a crest end ramp 136 for the given work surface 122 or slot 124. The volume threshold may thus vary for each work surface 122 or slot 124, and also vary after each cut or set of cuts that is made during the excavation process. Furthermore, the threshold module 144 may define a base volume threshold per iteration thereof based on either operator input or a previously defined volume threshold. For example, if the threshold module 144 is operating for the first time for a given machine 102, work surface 122 and/or slot 124, the base volume threshold may be initially defined via operator input or by preprogrammed values stored within memory 140. In other cases, the base volume threshold may simply be defined using the most recently applied or adjusted volume threshold carried over from a prior iteration, or the like.

Once a base threshold volume has been defined, the threshold module 144 of FIG. 5 may be configured to continuously or periodically monitor for changes in the work surface 122 or slots 124 that may suggest a need to adjust or update the base volume threshold initially defined. Moreover, the volume threshold may be automatically adjusted based on detected changes in any one or more of a number of different parameters, such as the slope of the target slot 124, the slope of the dumping valley 128 proximate to the crest end region 130, the volume of the existing terrain proximate to the crest end region 130, the physical specifications of the machine 102, operating conditions of the machine 102, and the like. The threshold module 144 may receive one or more parameters from any one or more of the feedback devices 110, locating devices 112, satellites 114, implement sensors 116, and the like, and based on those parameters adjust the volume threshold before, during and/or after each normal cut 132 is performed. In one example, if a first tracked parameter, such as the target slot slope, indicates a relatively high gradient, and a second tracked parameter, such as the specifications of the machine 102, indicates relatively less traction and/or insufficient power, the volume threshold may be decreased so as to enable earlier detection of crest end ramps 130. If, however, the tracked parameters collectively indicate better overall mobility, the volume threshold from a prior iteration may be maintained or increased so as to reduce the sensitivity with which crest end ramps 130 are detected.

Furthermore, the calculation module 146 of the controller 138 shown in FIG. 5 may be configured to calculate a volume of material within the crest end region 130, while the comparison module 148 may be configured to compare the calculated volume with the volume threshold defined by the threshold module 144. In particular, the calculation module 146 may configure the controller 138 to determine the current volume of material in the crest end region 130, for example, based on the volume of material remaining or already removed as detected by any one or more of the feedback devices 110, locating devices 112, satellites 114, implement sensors 116, or any other suitable scheme for assessing material volume within the crest end region 130. Once both the volume threshold and the calculated volume have been determined, the comparison module 148 may configure the controller 138 to determine how close the calculated volume of material in the crest end region 130 is to the volume threshold. More specifically, the comparison module 148 may determine if the volume threshold is exceeded, and if not, how close the calculated volume is to the current volume threshold.

Based on the comparison, the special cut module 150 of FIG. 5 may be configured to determine the response best suited to address the crest end ramp 130. For example, if the calculated volume approximates but does not exceed the volume threshold, the special cut module 150 may configure the controller 138 to issue a special ramp cut 152 as shown in FIG. 3. More specifically, by issuing a special ramp cut 152, the special cut module 150 may at least temporarily cease normal operations and engage the machine 102 to initiate a cut proximate to the beginning of the crest end region 130 in a manner that would efficiently remove the crest end ramp 136. Once the crest end ramp 136 has been removed, the controller 138 may resume normal operations and continue monitoring for new ramp formations. If, however, the calculated volume exceeds the volume threshold, the special cut module 150 may issue a special short cut 154 as shown in FIG. 3. When a special short cut 154 is issued, the controller 138 may at least temporarily cease normal operations and engage the machine 102 to initiate a cut into the crest end ramp 136 so as to remove the crest end ramp 136, or at least reduce the size of the crest end ramp 136 back down to within acceptable limits. Moreover, the cut location of the special short cut 154 may be selected based on the adjustable volume threshold. Once a special short cut 154 has been performed, the controller 138 may subsequently perform a special ramp cut 152 if necessary or resume normal operations. Alternatively, if the calculated volume neither approximates nor exceeds the volume threshold, the special cut module 150 may resume normal operations without issuing any special cuts at least until the next iteration.

Other variations and modifications to the algorithms or methods employed to operate the controllers 138 and/or control systems 108 disclosed herein will be apparent to those of ordinary skill in the art. One exemplary algorithm or method by which the controller 138 may be operated, for instance to automatically detect crest end ramps 136 along a work surface 122 and remove detected crest end ramps 136, is discussed in more detail below.

INDUSTRIAL APPLICABILITY

In general terms, the present disclosure sets forth methods, devices and systems for planned excavations or material moving operations where there are motivations to improve overall productivity and efficiency. Although applicable to any type of machine, the present disclosure may be particularly applicable to autonomously or semi-autonomously controlled tractors or dozing machines where the machines are controlled along particular travel routes within a worksite to excavate materials. Moreover, the present disclosure may provide means for enabling automated and early detection of crest end ramp formations within a crest end region of a work surface which may require removal in order to more efficiently achieve the end target profile. By providing more intuitive automated control systems, crest end ramps are more efficiently and proactively addressed, and delays and other drawbacks during excavation commonly caused thereby are substantially reduced.

Figure 6:
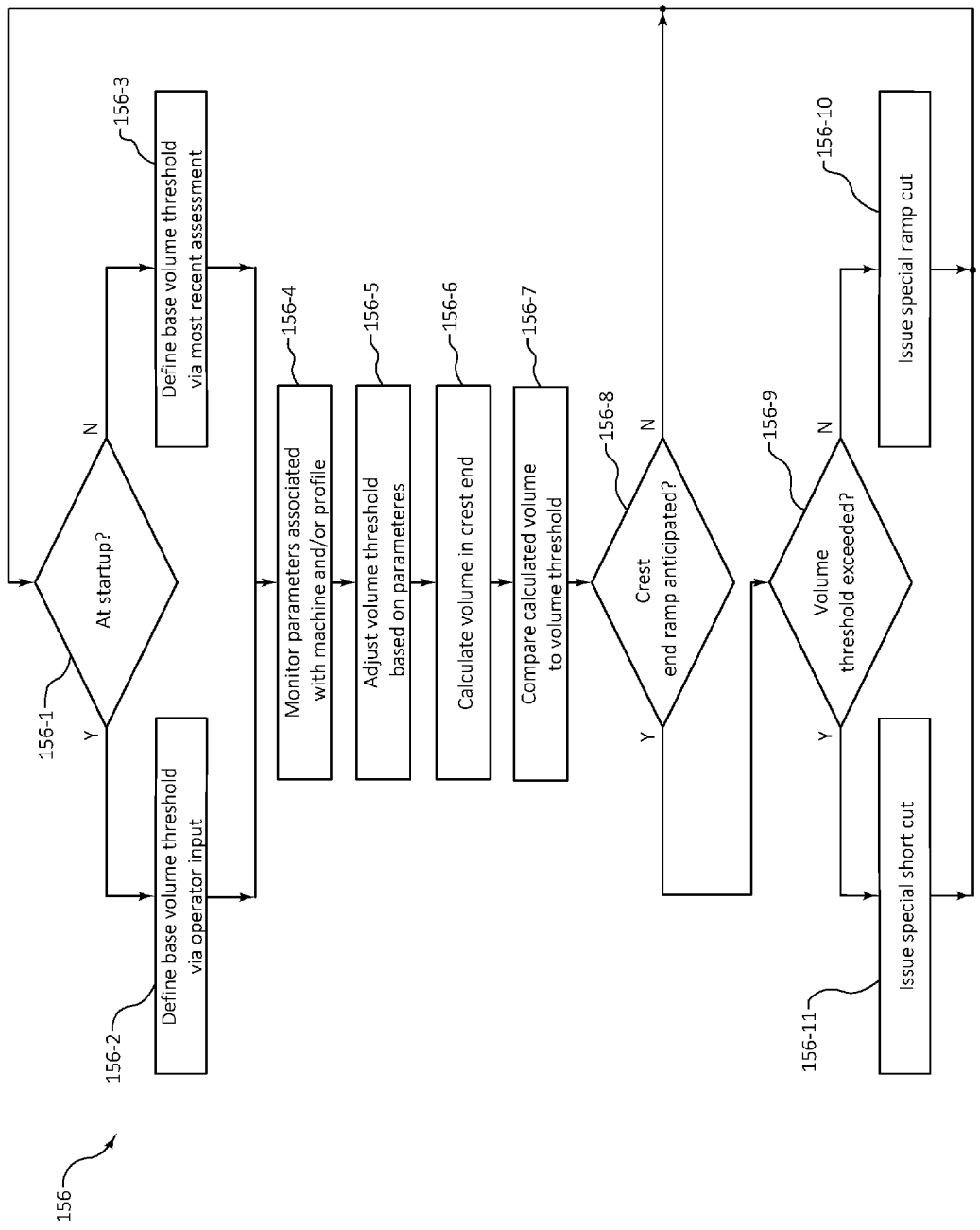
FIG. 6 is a flowchart of an exemplary disclosed algorithm or method that may configure a control system of the present disclosure to automatically identify and remove crest end ramps.

One exemplary algorithm or computer-implemented method 156 for automatically identifying and removing a crest end ramp 136 is diagrammatically provided in FIG. 6, according to which, for example, the control system 108 or the controller 138 thereof may be configured to operate. As shown in block 156-1 of FIG. 6, the controller 138 may initially be configured to determine whether the current iteration of the machine 102 and/or control system 108 is at startup or initiating a new task. If the current iteration corresponds to a new task, the controller 138 in block 156-2 may be configured to define a new base volume threshold based on, for example, operator input, preprogrammed default values, or the like. Alternatively, if the current iteration does not correspond to a new task but rather corresponds to a continuation of a prior or pre-existing task, the controller 138 in block 156-3 may be configured to define the base volume threshold using the most recently assessed or applied volume threshold, such as a volume threshold used in a prior iteration, or the like.

Once a base volume threshold has been established, the controller 138 may be configured to monitor parameters associated the machine 102 and/or the profile of the work surface 122 or slot 124 as in block 156-4 of FIG. 6. For example, the controller 138 may monitor for detected changes in any one or more of a number of different parameters, such as the slope of the target slot 124, the slope of the dumping valley 128 proximate to the crest end region 130, the volume of the existing terrain proximate to the crest end region 130, the physical specifications of the machine 102, operating conditions of the machine 102, and the like. The controller 138 may track one or more of these parameters via the communications device 142 as received from any one or more of the feedback devices 110, locating devices 112, satellites 114, implement sensors 116, and the like. Moreover, the controller 138 may observe these parameters continuously, periodically at predefined intervals, and/or for example, before, during or after each normal cut 132 is performed to account for any changes exhibited by either the machine 102 or the work surface 122 during the excavation.

If significant changes to either the machine 102 or work surface 122 are detected, the controller 138 may be configured to adjust the base volume threshold according to those changes as shown in block 156-5 of FIG. 6. For example, if the tracked parameters of the machine 102 and/or the profile of work surface 122 collectively anticipate a need for higher sensitivity for detecting a crest end ramp 136, the controller 138 may decrease the value of the volume threshold so as to allow for earlier detection of such a crest end ramp 136. Alternatively, if the parameters of the machine 102 and/or work surface 122 collectively suggest conditions in which the ability of the machine 102 to perform normal cuts 132 would not be so adversely affected by nominal crest end ramps 136, the controller 138 may increase the value of the volume threshold so as to reduce the sensitivity with which the controller 138 detects crest end ramps 136 and reduce unnecessary interruptions. Furthermore, if the parameters tracked in a given iteration indicate no notable change in either the machine 102 or the work surface 122, the controller 138 may maintain the base volume threshold as is.

As shown in block 156-6 of FIG. 6, the controller 138 may further be configured to calculate the actual volume of material within the crest end region 130. The controller 138 may calculate the volume of material within the crest end region 130 using any one or more of a variety of available techniques currently used in the art with respect to autonomously or semi-autonomously operated systems. For example, the controller 138 may assess material volume based on actual volumes of material already removed, volume differentials calculated between the starting volume of the work surface 122 as initially digitalized and the volume of material already removed therefrom, volume differentials between the starting volume of the work surface 122 and a current volume of the work surface 122 as derived from an updated digitalization of the work surface 122, and/or any other suitable technique for calculating the volume of material within the crest end region 130. The controller 138 may also calculate or estimate the volume within the crest end region 130 based on information provided via the communications device 142 and received from any one or more of the feedback devices 110, locating devices 112, satellites 114, implement sensors 116, and the like. Furthermore, the controller 138 may be configured to perform any one or more of the processes of blocks 156-4, 156-6 and 156-6 simultaneously or in different sequences than shown in FIG. 6.

Once each of the volume threshold and the calculated volume corresponding to the crest end region 130 for the given iteration is determined, the controller 138 may be configured to compare the calculated volume to the volume threshold in block 156-7 of FIG. 6. For example, the controller 138 in block 156-8 may determine whether the calculated volume of material within the crest end region 130 approximates or is at least sufficiently close to the volume threshold to justify further examination. If the calculated volume is determined to be safely below the volume threshold, the controller 138 may deem that there is no notable crest end ramp 136 and end the current iteration. The controller 138 may then return to block 156-1 to begin a new iteration and continue monitoring for crest end ramps 136. If, however, the calculated volume sufficiently approximates the volume threshold, the controller 138 may initially deem that a crest end ramp 136 exists and proceed to block 156-9 for further analysis. Specifically, the controller 138 may be configured to determine whether the calculated volume of material within the crest end region 130 also exceeds the volume threshold in order to determine the appropriate manner for addressing or removing the detected crest end ramp 136.

If the calculated volume of the crest end region 130 approximates but does not exceed the volume threshold, the controller 138 may be configured to issue a special ramp cut 152 in block 156-10 of FIG. 6. More specifically, the controller 138 may engage the machine 102 to at least temporarily cease current operations and initiate a cut at a location proximate to the start of the crest end region 130 in a manner best suited remove the crest end ramp 136. Once the crest end ramp 136 has been removed, the controller 138 may engage the machine 102 to resume normal cuts 132 or other prior operations. Alternatively, if the calculated volume of material within the crest end region 130 exceeds the volume threshold, the controller 138 may deem the crest end ramp 136 to be larger than the volume of material the machine 102 is capable or removing in a single pass, and thus issue a special short cut 154 in block 156-11. In particular, the controller 138 may at least temporarily cease current operations and engage the machine 102 to initiate a cut at a location best suited to remove the crest end ramp 136, or at least reduce the size of the crest end ramp 136 back down to within acceptable limits. The controller 138 may additionally select the cut location based on the adjustable volume threshold or other available parameters. Once a special short cut 154 has been performed, the controller 138 may subsequently perform a special ramp cut 152 if necessary or resume prior operations. Furthermore, after a special ramp cut 152 or a special short cut 154 has been issued, the controller 138 may end the current iteration and return to block 156-1 for example to being a new iteration.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A computer-implemented method for removing a crest end ramp along a work surface using a machine, comprising:
    defining a volume threshold corresponding to a crest end region of the work surface, the volume threshold being adjustable based on one or more parameters associated with the machine and the work surface;
    calculating a volume of material within the crest end region;
    comparing the calculated volume with the volume threshold;
    issuing a ramp cut if the calculated volume approximates but does not exceed the volume threshold; and
    issuing a short cut if the calculated volume exceeds the volume threshold.

2. The computer-implemented method of claim 1, wherein the volume threshold is initially defined based on one of operator input and a recently adjusted volume threshold.

3. The computer-implemented method of claim 1, wherein the volume threshold is adjustable based on one or more parameters pertaining to target slot slope, valley slope of a dumping valley proximate to the crest end region, existing terrain proximate to the crest end region, physical specifications of the machine, and operating conditions of the machine.

4. The computer-implemented method of claim 1, wherein the volume threshold is automatically adjusted per iteration of the method according to monitored changes in the parameters associated with the machine and the work surface.

5. The computer-implemented method of claim 1, wherein the volume threshold corresponds to a minimum volume by which excess material within the crest end region can be classified as a crest end ramp.

6. The computer-implemented method of claim 1, wherein issuing the ramp cut automatically configures the machine to remove the crest end ramp.

7. The computer-implemented method of claim 6, wherein the ramp cut is initiated at a cut location immediately preceding the crest end region.

8. The computer-implemented method of claim 1, wherein issuing the short cut automatically configures the machine to remove at least a portion of the crest end ramp.

9. The computer-implemented method of claim 8, wherein the short cut is initiated at a cut location determined based at least partially on the volume threshold.

10. A control system for removing a crest end ramp along a work surface using a machine, comprising:
    a memory configured to retrievably store one or more algorithms; and
    a controller in communication with the memory and, based on the one or more algorithms, configured to at least:
    calculate a volume of material within a crest end region of the work surface,
    compare the calculated volume with an adjustable volume threshold corresponding to the crest end region, and
    issue a ramp cut if the calculated volume approximates but does not exceed the volume threshold.

11. The control system of claim 10, wherein the controller is further configured to issue a short cut if the calculated volume exceeds the volume threshold.

12. The control system of claim 11, wherein the ramp cut automatically configures the machine to remove the crest end ramp, and the short cut automatically configures the machine to remove at least a portion of the crest end ramp, a cut location of the short cut being determined based at least partially on the volume threshold.

13. The control system of claim 10, wherein the controller is further configured to adjust the volume threshold based on one or more monitored parameters associated with the machine and the work surface pertaining to any one or more of target slot slope, valley slope of a dumping valley proximate to the crest end region, existing terrain proximate to the crest end region, physical specifications of the machine, and operating conditions of the machine.

14. The control system of claim 10, wherein the controller is configured to initially define the volume threshold based on one of operator input and a recently adjusted volume threshold.

15. The control system of claim 10, wherein the controller is configured to define the volume threshold to correspond to a minimum volume by which excess material within the crest end region can be classified as a crest end ramp.

16. A controller for removing a crest end ramp along a work surface using a machine, comprising:
    a threshold module configured to define a volume threshold corresponding to a crest end region of the work surface and adjust the volume threshold based on one or more parameters associated with the machine and the work surface;
    a calculation module configured to calculate a volume of material within the crest end region;
    a comparison module configured to compare the calculated volume with the volume threshold; and
    a special cut module configured to issue a ramp cut if the calculated volume approximates but does not exceed the volume threshold, and issue a short cut if the calculated volume exceeds the volume threshold.

17. The controller of claim 16, wherein the threshold module is configured to initially define the volume threshold based on one of operator input and a recently adjusted volume threshold.

18. The controller of claim 16, wherein the threshold module is configured to adjust the volume threshold based on one or more monitored parameters pertaining to any one or more of target slot slope, valley slope of a dumping valley proximate to the crest end region, existing terrain proximate to the crest end region, physical specifications of the machine, and operating conditions of the machine.

19. The controller of claim 16, wherein the threshold module is configured to define the volume threshold to correspond to a minimum volume by which excess material within the crest end region can be classified as a crest end ramp.

20. The controller of claim 16, wherein the special cut module is configured such that issuing the ramp cut automatically configures the machine to remove the crest end ramp, and issuing the short cut automatically configures the machine to remove at least a portion of the crest end ramp, a cut location of the short cut being determined based at least partially on the volume threshold.

\* \* \* \* \*